(12) United States Patent
Laas

(10) Patent No.: US 10,844,161 B2
(45) Date of Patent: Nov. 24, 2020

(54) SILANE-FUNCTIONAL POLYMERIC POLYURETHANES

(71) Applicant: Covestro Deutschland AG, Leverkusen (DE)

(72) Inventor: Hans-Josef Laas, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 73 days.

(21) Appl. No.: 16/323,604

(22) PCT Filed: Aug. 8, 2017

(86) PCT No.: PCT/EP2017/070078
§ 371 (c)(1),
(2) Date: Feb. 6, 2019

(87) PCT Pub. No.: WO2018/029197
PCT Pub. Date: Feb. 15, 2018

(65) Prior Publication Data
US 2019/0202973 A1 Jul. 4, 2019

(30) Foreign Application Priority Data

Aug. 9, 2016 (EP) .................................... 16183429

(51) Int. Cl.
| | | |
|---|---|---|
| *C08G 18/80* | (2006.01) |
| *C08G 18/62* | (2006.01) |
| *C08G 18/71* | (2006.01) |
| *C08G 18/40* | (2006.01) |
| *C08G 18/42* | (2006.01) |
| *C08G 18/79* | (2006.01) |
| *C08G 18/28* | (2006.01) |
| *C08G 18/75* | (2006.01) |
| *C09D 175/04* | (2006.01) |
| *C09J 175/14* | (2006.01) |
| *C08G 18/24* | (2006.01) |
| *C08G 18/73* | (2006.01) |
| *C09D 175/14* | (2006.01) |
| *C08G 18/22* | (2006.01) |
| *C09J 175/04* | (2006.01) |
| *C08G 18/68* | (2006.01) |

(52) U.S. Cl.
CPC ......... *C08G 18/809* (2013.01); *C08G 18/227* (2013.01); *C08G 18/246* (2013.01); *C08G 18/289* (2013.01); *C08G 18/4063* (2013.01); *C08G 18/4219* (2013.01); *C08G 18/6254* (2013.01); *C08G 18/6258* (2013.01); *C08G 18/683* (2013.01); *C08G 18/718* (2013.01); *C08G 18/73* (2013.01); *C08G 18/755* (2013.01); *C08G 18/797* (2013.01); *C09D 175/04* (2013.01); *C09D 175/14* (2013.01); *C09J 175/04* (2013.01); *C09J 175/14* (2013.01); *C08G 2150/00* (2013.01); *C08G 2170/00* (2013.01); *C08G 2190/00* (2013.01)

(58) Field of Classification Search
CPC ............ C08G 18/4263; C08G 18/6254; C08G 18/718; C08G 18/6258; C09J 201/10; C08L 101/10
See application file for complete search history.

(56) References Cited

U.S. PATENT DOCUMENTS

| | | | |
|---|---|---|---|
| 3,494,951 | A | 2/1970 | Berger |
| 3,640,967 | A | 2/1972 | König et al. |
| 4,419,294 | A | 12/1983 | Feldman et al. |
| 5,364,955 | A | 11/1994 | Zwiener et al. |
| 5,914,383 | A | 6/1999 | Richter et al. |
| 6,090,939 | A | 7/2000 | Richter et al. |
| 6,515,096 | B2 | 2/2003 | Windmueller et al. |
| 6,730,768 | B2 | 5/2004 | Heidbreder et al. |
| 7,879,407 | B2 | 2/2011 | Poppeq et al. |
| 8,013,099 | B2 | 9/2011 | Poppe et al. |
| 8,431,674 | B2 | 4/2013 | Ludewig et al. |
| 8,569,438 | B2 | 10/2013 | Groenewolt et al. |
| 8,808,805 | B2 | 8/2014 | Groenewolt et al. |
| 9,321,879 | B2 | 4/2016 | Laufer et al. |
| 9,353,210 | B2 | 5/2016 | Laas et al. |
| 9,593,135 | B2 | 3/2017 | Spyrou et al. |
| 9,637,506 | B2 | 5/2017 | Laas |
| 9,644,111 | B2 | 5/2017 | Hoffmann et al. |
| 9,796,876 | B2 | 10/2017 | Lomoelder et al. |
| 10,125,155 | B2 | 11/2018 | Eggert |
| 2009/0326146 | A1 | 12/2009 | Sepeur et al. |
| 2011/0082254 | A1 | 4/2011 | Sepeur et al. |

(Continued)

FOREIGN PATENT DOCUMENTS

| | | |
|---|---|---|
| CA | 1081389 A | 7/1980 |
| DE | 2301725 A1 | 7/1974 |
| DE | 2356768 B1 | 1/1975 |
| DE | 2358038 A1 | 5/1975 |
| DE | 1770245 A1 | 9/1975 |
| DE | 102010015683 A1 | 10/2011 |
| EP | 0070475 A2 | 1/1983 |
| EP | 0372561 A2 | 6/1990 |
| EP | 0596360 A1 | 5/1994 |
| EP | 0649850 A1 | 4/1995 |
| EP | 0659792 A2 | 6/1995 |
| EP | 0689556 A1 | 1/1996 |

(Continued)

OTHER PUBLICATIONS

International Search Report for PCT/EP2017/070078 dated Oct. 11, 2017.

(Continued)

*Primary Examiner* — Kuo Liang Peng
(74) *Attorney, Agent, or Firm* — Faegre Drinker Biddle & Reath LLP

(57) ABSTRACT

The invention relates to a method for producing polyurethanes containing silane groups, to products that can be obtained by means of said method, and to the use of said products for producing cross-linkable binders, in particular for coatings, sealant raw materials, or glue raw materials.

15 Claims, No Drawings

(56) References Cited

U.S. PATENT DOCUMENTS

| | | |
|---|---|---|
| 2013/0244043 A1 | 9/2013 | Lomoelder et al. |
| 2015/0259461 A1* | 9/2015 | Laas .................... C08G 18/289 525/102 |
| 2016/0108280 A1 | 4/2016 | Hallack et al. |

FOREIGN PATENT DOCUMENTS

| | | |
|---|---|---|
| EP | 0798299 A1 | 10/1997 |
| EP | 0890604 A1 | 1/1999 |
| EP | 0896009 A1 | 2/1999 |
| EP | 0937110 A1 | 8/1999 |
| EP | 0962455 A1 | 12/1999 |
| EP | 0978523 A1 | 2/2000 |
| EP | 1136495 A2 | 9/2001 |
| EP | 1995261 A1 | 11/2008 |
| EP | 2046861 A1 | 4/2009 |
| EP | 2641925 A1 | 9/2013 |
| EP | 2660259 A1 | 11/2013 |
| WO | WO-9421702 A1 | 9/1994 |
| WO | WO-9821255 A1 | 5/1998 |
| WO | WO-2006042658 A1 | 4/2006 |
| WO | WO-2007033786 A1 | 3/2007 |
| WO | WO-2008013731 A1 | 1/2008 |
| WO | WO-2008034409 A2 | 3/2008 |
| WO | WO-2008074489 A1 | 6/2008 |
| WO | WO-2009077180 A1 | 6/2009 |
| WO | WO-2009115079 A1 | 9/2009 |
| WO | WO-2011124710 A1 | 10/2011 |
| WO | WO-2013189882 A2 | 12/2013 |
| WO | WO-2014016019 A1 | 1/2014 |
| WO | WO-2014037265 A1 | 3/2014 |
| WO | WO-2014037279 A1 | 3/2014 |
| WO | WO-2014063895 A1 | 5/2014 |
| WO | WO-2014180623 A1 | 11/2014 |
| WO | WO-2015113923 A1 | 8/2015 |
| WO | WO-2016010900 A1 | 1/2016 |

OTHER PUBLICATIONS

Written Opinion of the International Searching Authority for PCT/EP2017/070078 dated Oct. 11, 2017.

International Preliminary Report on Patentability for International Application No. PCT/EP2017/070078, dated Feb. 21, 2019.

\* cited by examiner

SILANE-FUNCTIONAL POLYMERIC POLYURETHANES

CROSS-REFERENCE TO RELATED APPLICATIONS

This application is a national stage application (under 35 U.S.C. § 371) of PCT/EP2017/070078, filed Aug. 8, 2017, which claims benefit of European Application No. 16183429.6, filed Aug. 9, 2016, both of which are incorporated herein by reference in their entirety.

The invention relates to a process for preparing silane-containing polyurethanse, to the silane-containing polyurethanes obtainable by this process, to the use thereof as binders in crosslinkable raw materials for lacquers, sealants or adhesives, and to the crosslinkable hinders comprising the inventive silane-containing polyurethanes.

BACKGROUND OF THE INVENTION

Silane-functional polyurethanes have long been known and been described numerous times as binders for adhesives, sealants or coatings.

Polyurethanes bearing silane groups can be prepared in various ways, for example by reacting polyisocyanates or isocyanate-functional prepolymers with isocyanate-reactive silane compounds, for example secondary aminoalkylsilanes or mercaptoalkylsilanes.

One method, which is frequently preferred since it leads to silane-functional polyurethanes of particularly low viscosity, involves reacting hydroxy-functional compounds, for example polyether polyols, polyurethane polyols or polyester polyols, with isocyanatoorganosilanes, for example the isocyanatoalkylalkoxysilanes described in U.S. Pat. No. 3,494,951 or EP-A 0 649 850. Using such isocyanatoalkylsilanes, it is possible, for example, starting from hydroxy-functional polyurethane prepolymers or polyether polyols, to prepare low-viscosity silane-terminated polyurethane prepolymers which can serve as binders for moisture-crosslinking adhesives and sealants (see, for example, EP-A 0 070 475 and EP-A 0 372 561).

The reaction of isocyanatopropyltrimethoxysilane or isocyanatopropyltriethoxysilane with polyols according to the teaching of WO 2009/115079 leads to alkoxysilane-containing polyurethanes which can be cured thermally in the presence of suitable catalysts, even with exclusion of water, and enable, for example, the formulation of automotive lacquers of very high scratch resistance. One exemplary embodiment specifically describes the reaction of a polyol mixture consisting of two polyacrylate polyols and the low molecular weight 1,6-hexanediol with an HDI biuret and isocyanatopropyltrimethoxysilane.

Adducts of isocyanatoalkylalkoxysilanes, for example isocyanatopropyltrimethoxysilane, and low molecular weight branched diols or polyols containing up to 20 carbon atoms and also the use thereof as a self-crosslinking binder or as a curing agent for hydroxy-functional binders in 2K coating systems are disclosed in EP-A 2 641 925. In addition to the low molecular weight branched diols or polyols it is also possible to co-use in the preparation of the adducts up to a proportion of 40% by weight of further diols and/or polyols, also including for example hydroxyl-containing polyesters or polyacrylates.

WO 2013/189882 describes adducts of isocyanatotrialkoxysilanes and polyhydric alcohols as additional crosslinking agents in nonaqueous two component polyurethane lacquers (2K-PUR). It is preferable when the employed polyhydric alcohols are low molecular weight branched diets and/or polyols which may also contain a proportion of up to 40% by weight of hydroxyl-containing polymers, for example polyester polyols or polacrylate polyols.

WO 2014/180623 describes moisture-curable coating compositions containing at least one adduct of an isocyanatosilane onto a hydroxy-functional compound, a tin-containing catalyst and an aminosilane. Recited as suitable bydroxyl-functional compounds for preparing the adducts are monohydric or polyhydric alcohols and polyols also including in a long list of suitable polymeric polyols hydroxyl-functional polyacrylates. However, in the working examples of this publication only a low molecular weight 2:1 adduct (molar) of isocyanatopropyltrimethoxysilane and 1,9-nonanediol in the form of Vestanat M 95 is used.

WO 2008/034409 describes for example the partial conversion of a commercially available polyester polyol Desmophen 1145 (Covestro Deutschland AG) with a deficiency of isocyanatopropyltriethoxysilane. On account of the chosen equivalent ratio less than 15% of the hydroxyl groups originally present in the polyol are urethanized.

WO 2014/037265 describes the preparation of silane-functional binders having a thiourethane structure by reaction of polyols with low-monomer diisocyanate/mercaptosilane adducts. The polymeric polyacrylate and polyester polyols mentioned in the examples are exclusively reacted in a mixture with considerable amounts, based on the hydroxyl equivalent, of a low molecular weight diol.

The complete conversion of all hydroxyl groups of polymeric polyester and/or polyacrylate polyols with isocyanatoalkoxysilanes preferably without co-use of large amounts of low molecular weight, low-functionality alcohols has not hitherto been described. The applicants own experiments have shown that upon exclusive use of polymeric polyols under customary reaction conditions, for example at temperatures above 60° C., gelling of the reaction batch occurs even before the end of the urethanization reaction.

BRIEF SUMMARY OF THE INVENTION

The present invention accordingly has for its object to provide a novel process for preparing alkoxysilane-modified polyurethanes which makes it possible for polymeric polyols, for example polyester and/or polyacrylate polyols, preferably also without co-use of low molecular weight alcohols, to achieve complete reaction with isocyanatoalkoxysilanes in a safe and reproducible manner. The products obtainable by this process should be suitable for all fields of use of silane-functional polyurethanes, especially as binders for moisture-crosslinkable or thermally curable adhesives, sealants or coatings.

This object was achieved by the process according to the invention more particularly described hereinbelow. The process according to the invention is based on the surprising observation that polymeric polyester and/or polyacrylate polyols such as are commercially available for example as binder components for 2K-PUR lacquers after preferably complete chemical reaction of the carboxyl groups present in the polymer, preferably also in the absence of low molecular weight alcohols, react very readily with isocyanatosilanes, particularly preferably completely, to afford silane-functional polyurethanes.

DETAILED DESCRIPTION OF THE INVENTION

The present invention provides a process for preparing silane-containing polyurethanes comprising the reaction of A) at least one polymeric polyol having an acid number determined according to DIN EN ISO 2114:2002-06 of 0.01 to 30.0 mg KOH/g based on the solids content with B) at least one compound which has at least one carboxyl-reactive group and contains at least one epoxy group, carbodiimide group and/or 2-oxazoline group to obtain a reaction product and the reaction of the reaction product with C) at least one alkoxysilane-functional isocyanate.

In a first preferred embodiment the polymeric polyol A) is an at least difunctional polymeric polyol having a number-average molecular weight $M_n$ of 270 g/mol to 22000 g/mol, preferably of 500 g/mol to 18000 g/mol, particularly preferably of 800 g/mol to 12000 g/mol. It is likewise preferred, and in combination with the abovementioned number-average molecular weights particularly preferred, when the polymeric polyol A) is at least one difunctional polyol and has an acid number determined according to DIN EN ISO 2114: 2002-06 of 0.01 to 30.0 mg KOH/g, preferably 0.1 to 25.0 mg KOH/g, particularly preferably 0.2 to 20.0 mg KOH/g, in each case based on the solids content.

In the present document "polymeric polyols" are to be understood as meaning molecules having at least two hydroxyl groups which are constructed from a plurality of identical or different repeating units and are preparable by methods of macromolecular chemistry known per se, for example by polymerization, polycondensation or polyaddition. The term "polymeric polyols" shall also encompass so-called oligomeric polyols which are generally constructed from only a few, for example 3 to 20, units, wherein the transition from oligomers to polymers of low molecular weight is fluid.

The number-average molecular weights $M_n$ of the polymeric polyols A) recited in the present document were determined by gel permeation chromatography (GPC) using a polystyrene standard and tetrahydrofuran as eluent according to DIN 55672-1:2016-03.

According to the invention the terms "comprising" or "containing" preferably mean "consisting essentially of" and particularly preferably mean "consisting of".

Suitable polymeric polyols A) for the process according to the invention include in particular polyester polyols, polycarbonate polyols and/or polyacrylate polyols. It is preferable when these polyols have an average OH functionality of 2 to 6 and particularly preferably an average functionality of 2 to 4.

Suitable polyester polyols A) include for example those of the type specified in EP-A 0 978 523, page 5 lines 17 to 47, or EP-A 0 659 792, page 6 lines 32 to 45, provided that they meet the specifications made above in terms of functionality and molecular weight. Particularly preferred polyester polyols are condensation products of polyhydric alcohols, for example ethane-1,2-diol, propane-1,2-diol, diethylene glycol, butane-1,4-diol, hexane-1,6-diol, neopentyl glycol, cyclohexane-1,4-dimethanol, cyclohexane-1,4-diol, perhydrobisphenol, 1,1,1-trimethylolpropane, propane-1,2,3-triol, pentaerythritol and/or sorbitol, with substoichiometric amounts of polybasic carboxylic acids or carboxylic anhydrides, for example succinic acid, adipic acid, sebacic acid, dodecanedioic acid, glutaric anhydride, maleic anhydride, phthalic anhydride, isophthalic acid, terephthalic acid, trimellitic acid, hexahydrophthalic anhydride and/or tetrahydrophthalic anhydride, or those as obtainable in a manner known per se from lactones, for example ε-caprolactone, and simple monohydric alcohols, for example those mentioned above by way of example, as starter molecules with ring opening.

Suitable polycarbonate polyols A) include in particular the known-per-se reaction products of dihydric alcohols, for example those recited by way of example hereinabove in the list of the polyhydric alcohols, with diaryl carbonates, for example diphenyl carbonate, dimethyl carbonate or phosgene. Suitable polycarbonate polyols A) further include those that contain not only carbonate structures but also ester groups. These are, in particular, the polyestercarbonate diols, known per se, of the kind obtainable, for example, according to the teaching of DE-B 1 770 245 by reaction of dihydric alcohols with lactones, such as in particular ε-caprolactone, and subsequent reaction of the resultant polyester diols with diphenyl or dimethyl carbonate. Suitable polycarbonate polyols A) likewise include those that contain not only carbonate structures but also ether groups. These are in particular the polyether carbonate polyols known per se as obtainable, for example, by the process of EP-A 2 046 861 by catalytic reaction of alkylene oxides (epoxides) and carbon dioxide in the presence of H-functional starter substances.

Suitable polyacrylate polyols A) include for example those of the type specified in WO 2011/124710 page 10, line 32 to page 13, line 18 provided that they meet the specifications made above in terms of functionality and molecular weight. Particularly preferred polyacrylate polyols A) are polymers/copolymers of hydroxyalkyl esters of acrylic acid, methacrylic acid, for example hydroxyethyl acrylate, hydroxypropyl acrylate, hydroxybutyl acrylate hydroxyethyl methacrylate, hydroxypropyl methacrylate or hydroxybutyl methacrylate, optionally together with alkyl acrylates and/or alkyl methacrylates, for example methyl acrylate, ethyl acrylate, n-butyl acrylate, iso-butyl acrylate, 2-ethylhexyl acrylate, cyclohexyl acrylate, isobornyl acrylate, lauryl acrylate, methyl methacrylate, ethyl methacrylate, n-butyl methacrylate, isobutyl methacrylate, 2-ethylhexyl methacrylate, cyclohexyl methacrylate, isobornyl methacrylate, lauryl methacrylate, styrene or other copolymerizable olefinically unsaturated monomers, for example acrylic acid, methacrylic acid or dimethyl maleate.

Suitable polyols A) also include for example the known polyacetal polyols obtainable by reaction of simple glycols, for example diethylene glycol, triethylene glycol, 4,4'-di((2-hydroxyethoxy)phenyl)dimethylmethane (adduct of 2 mol of ethylene oxide onto bisphenol A) or hexanediol, with formaldehyde or else polyacetals prepared by polycondensation of cyclic acetals, for example trioxane.

Further suitable polyols A) also include those described in EP-A 0 689 556 and EP-A 0 937 110, for example specific polyols obtainable by reaction of epoxidized fatty acid esters with aliphatic or aromatic polyols by epoxide ring opening.

Likewise employable as polyols A) are hydroxyl-containing polybutadienes.

The polymeric polyols A) may be used individually or in the form of any desired mixtures with one another in the process according to the invention. They may be either solvent-free or dissolved in customary solvents.

Suitable solvents are especially those which are inert toward the reactive groups of the alkoxysilane-functional isocyanates C), for example the known customary aprotic lacquer solvents, for example ethyl acetate, butyl acetate, ethylene glycol monomethyl ether acetate or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, petroleum spirit, aromatics having a relatively high degree of substitution, as commercially available, for example, under the Solvent naphtha, Solvesso®, Isopar®, Nappar® (Deutsche EXXON CHEMICAL GmbH, Cologne, DE) and Shellsol® (Deutsche Shell Chemie GmbH, Eschborn, DE) names, but also solvents such as propylene glycol diacetate, diethylene glycol dimethyl ether, dipropylene glycol dimethyl ether, diethylene glycol ethyl and butyl ether acetate, ethyl ethoxypropionate, propylene carbonate, N-methylpyrrolidone and N-methylcaprolactam, or any desired mixtures of such solvents.

The components B) employed in the process according to the invention are any desired compounds which have at least one carboxyl-reactive group and contain at least one epoxy group, carbodiimide group and/or 2-oxazoline group and which preferably have a number-average molecular weight of 44 to 2000, preferably of 128 to 1500 and particularly preferably of 250 to 1000, for example those generally known as acid scavengers in lacquer technology.

In a further preferred embodiment the compound B) which has at least one carboxyl-reactive group contains one to three, particularly preferably one or two and very particularly preferably precisely one epoxy group, carbodiimide group and/or 2-oxazoline group.

Suitable epoxy-containing compounds B) include for example 1,2-epoxyethane, 1,2-epoxypropane, 1,2-epoxybutane, 1,2-epoxyhexane, 1,2-epoxyheptane, 1,2-epoxydecane, 1,2-epoxydodecane, 1,2-epoxytetradecane, 1,2-epoxyhexadecane, 1,2-epoxyoctadecane, 1,2-epoxycyclopentane, 1-methyl-1,2-epoxycyclopentane, 1,2-epoxycyclohexane, 1,2-epoxycycloheptane, 1,2-epoxycyclooctane, isophorone oxide, styrene oxide, (2,3-epoxypropyl)benzene, trans-stilbene oxide, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, 2-(3,4-epoxycyclohexypethyl)ethyltriethoxysilane, 1,2,7,8-diepoxyoctane, 1,2,5,6-diepoxycyclooctane, butyl glycidyl ether, 2-ethylhexyl glycidyl ether, versatic acid glycidyl ester, hexahydrophthalic acid diglycidyl ester, bisphenol-A diglycidyl ether (BADGE), glycerol glycidyl ether and triglycidyl isocyanurate (TGIC).

Suitable carbodiimide-containing compounds B) in principle include any desired monomeric or polymeric carbodiimides such as are obtainable for example in a manner known per se by catalyzed thermal polycondensation from aliphatic, cycloaliphatic, araliphatic and/or aromatic mono- and/or diisocyanates.

These include for example cycloaliphatic carbodiimides such as for example dicyclohexyl carbodiimide or the carbodiimides described in DE 2 301 725, DE 2 358 038 and EP 0 890 604 based on 1-isocyanato-3,3,5-trimethyl-5-isocyanatomethylcyclohexane (isophorone diisocyanate; IPDI), 2,4'- and 4,4'-diisocyanatodicyclohexylmethane and/or cyclohexyl isocyanate, carbodiimides of tertiarily bonded isocyanate groups, for example the carbodiimides described in U.S. Pat. No. 4,419,294 based on 1,3-bis(1-isocyanato-1-methylethyl)benzene (TMXDI) and 1-isocyanato-4-(1-isocyanato-1-methylethyl)-1-methyl-cyclohexane, aromatic carbodiimides, for example those based on 2,4- and 2,6-tolylene diisocyanate, 2,4'- and 4,4'-diphenylmethane diisocyanate, 1,3- and 1,4-phenylene diisocyanate, and in particular those based on aromatic isocyanates each bearing in at least one o-position to the isocyanate group an aliphatic substituent having 1 to 6 carbon atoms, preferably an isopropyl radical, for example o-tolyl isocyanate, 2,6-diisopropylphenyl isocyanate and/or 1,3,5-triisopropylbenzene 2,4-diisocyanate.

Suitable oxazoline-containing compounds B) include for example 2-methyl-2-oxazoline, 2-hydroxyethyl-2-oxazoline, 2-hydroxypropyl-2-oxazoline, 5-hydroxypentyl-2-oxazoline and/or 1,3-phenylenebis-2-oxazoline.

Particularly preferred compounds B) having carboxyl-reactive groups are mono- and polycarbodiimides based on 2,6-diisopropylphenyl isocyanate and/or 1,3,5-triisopropylbenzene 2,4-diisocyanate, such as are available for example under the trade name Stabaxol® from Rheinchemie Rheinau GmbH (Deutschland). The use of di-(2,6-diisopropylphenyl)-carbodiimide is very particularly preferred (Stabaxol® I).

The compounds B) having carboxyl-reactive groups can be used in the process according to the invention either individually or in the form of any desired mixtures with one another. Depending on the nature of the employed polyol A) and the compounds B) having carboxyl-reactive groups, even reaction with a molar deficiency of carboxylic-reactive groups may be sufficient to achieve the stabilizing effect according to the invention. However, in a further preferred embodiment the reaction of the polymeric polyol A) with the at least one compound B) having carboxyl-reactive groups is carried out while maintaining an equivalent ratio of carboxyl groups to carboxyl-reactive groups of 1.5:1 to 1:5, preferably 1.2:1 to 1:2 and particularly preferably 1.1:1 to 1:1.1.

It is very particularly preferable when the compound B) is added in an amount such that each carboxyl group of the polymeric polyol A) has at least one carboxyl-reactive group allotted to it.

In the process according to the invention after the reaction, preferably following the reaction, of the polymeric polyol A) with a carboxyl-reactive compound B) the obtained reaction product is in a further process step reacted with at least one alkoxysilane-functional isocyanate C). Before the reaction with C) the reaction product obtained from the reaction of A) with B) may optionally be subjected to any further desired intermediate steps provided that during the reaction with the at least one alkoxysilane-functional isocyanate C) a sufficient amount of hydroxyl groups remains in the reaction product. However, it is particularly preferable when the reaction of the reaction product with the alkoxysilane-functional isocyanate C) is carried out without intermediate steps.

The alkoxysilane-functional isocyanates C) are any desired compounds in which at least one, preferably precisely one, isocyanate group and at least one, preferably precisely one, slime group having at least one alkoxy substituent are simultaneously present alongside one another. The alkoxysilane-functional isocyanate C) is hereinbelow also referred to as isocyanatoalkoxysilane C).

Suitable isocyanatoalkoxysilanes C) include for example isocyanatoalkylalkoxysilanes such as are obtainable for example by the processes described in U.S. Pat. No. 3,494,951, EP-A 0 649 850, WO 2014/063895 and WO 2016/010900 via a phosgene-free route by thermal cleavage of the corresponding carbonates or ureas.

In a further preferred embodiment the employed alkoxysilane-functional isocyanate C) is at least one compound of general formula (I)

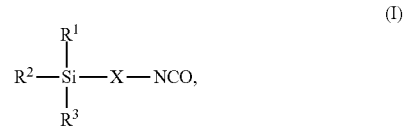

in which
- R$^1$, R$^2$ and R$^3$ independently of one another represent identical or different saturated or unsaturated linear or branched, aliphatic or cycloaliphatic or optionally substituted aromatic or araliphatic radicals having up to 18 carbon atoms which may optionally contain up to 3 heteroatoms from the group of oxygen, sulfur, nitrogen, preferably in each case alkyl radicals having up to 6 carbon atoms and/or alkoxy radicals having up to 6 carbon atoms which may contain up to 3 oxygen atoms, particularly preferably in each case methyl, methoxy and/or ethoxy with the proviso that at least one of the radicals R$^1$, R$^2$ and R$^3$ is connected to the silicon atom via an oxygen atom and
- X represents a linear or branched organic radical having up to 6, preferably 1 to 4, carbon atoms, particularly preferably a propylene radical (—CH2-CH2-CH2-).

Examples of such isocyanatoalkoxysilanes include isocyanatomethyltrimethoxysilane, isocyanatomethyltriethoxysilane, isocyanatomethyltriisopropoxysilane, 2-isocyanatoethyltrimethoxysilane, 2-isocyanatoethyltriethoxysilane, 2-isocyanatoethyltriisopropoxysilane, 3-isocyanatopropyltrimethoxysilane, 3-isocyanatopropyltriethoxysilane, 3-isocyanatopropylmethyldimethoxysilane, 3-isocyanatopropylmethyldiethoxysilane, 3-isocyanatopropylethyldiethoxysilane, 3-isocyanatopropyldimethylethoxysilane, 3-isocyanatopropyldiisopropylethoxysilane, 3-isocyanatopropyltripropoxysilane, 3-isocyanatopropyltriisopropoxysilane, 3-isocyanatopropyltributoxysilane, 3-isocyanatopropylmethyldibutoxysilane, 3-isocyanatopropylphenyldimethoxysilane, 3-isocyanatopropylphenyldiethoxysilane, 3-isocyanatopropyltris(methoxyethoxyethoxy)silane, 2-isocyanatoisopropyltrimethoxysilane, 4-isocyanatobutyltrimethoxysilane, 4-isocyanatobutyltriethoxysilane, 4-isocyanatobutyltriisopropoxysilane, 4-isocyanatobutylmethyldimethoxysilane, 4-isocyanatobutylmethyldiethoxysilane, 4-isocyanatobutylethyldimethoxysilane, 4-isocyanatobutylethyldiethoxysilane, 4-isocyanatobutyldimethylmethoxysilane, 4-isocyanatobutylphenyldimethoxysilane, 4-isocyanatobutylphenyldiethoxysilane, 4-isocyanato(3-methylbutyl)trimethoxysilane, 4-isocyanato(3-methylbutyl)triethoxysilane, 4-isocyanato(3-methylbutyl)methyldimethoxysilane, 4-isocyanato(3-methylbutyl)methyldiethoxysilane and 11-isocyanatoundecyltrimethoxysilane or any desired mixtures of such isocyanatoalkoxysilanes.

Suitable isocyanatoalkoxysilanes C) also include for example isocyanatosilanes having a thiourethane structure such as are obtainable by the process in WO 2014/037279 by reaction of any desired aliphatic, cycloaliphatic, araliphatic or aromatic diisocyanates with any desired mercaptosilanes in an NCO:SH ratio of 6:1 to 40:1 and subsequent removal of excess unconverted monomeric diisocyanates by thin-film distillation.

In a further preferred embodiment the employed isocyanatoalkoxysilane C) is at least one compound of general formula (II)

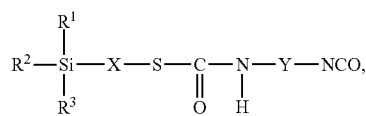

(II)

which is present in admixture with subordinate amounts of silane-functional compounds of general formula (III),

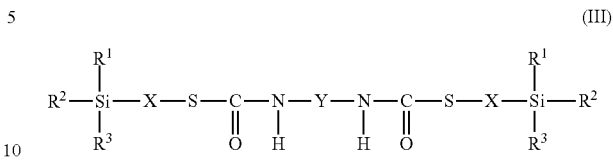

(III)

wherein in formulae (II) and (III)
- R$^1$, R$^2$ and R$^3$ independently of one another represent identical or different saturated or unsaturated linear or branched, aliphatic or cycloaliphatic or optionally substituted aromatic or araliphatic radicals having up to 18 carbon atoms which may optionally contain up to 3 heteroatoms from the group of oxygen, sulfur, nitrogen, preferably in each case alkyl radicals having up to 6 carbon atoms and/or alkoxy radicals having up to 6 carbon atoms which may contain up to 3 oxygen atoms, particularly preferably in each case methyl, methoxy and/or ethoxy with the proviso that at least one of the radicals R$^1$, R$^2$ and R$^3$ is connected to the silicon atom via an oxygen atom,
- X represents a linear or branched organic radical having up to 6, preferably 1 to 4, carbon atoms, particularly preferably a propylene radical (—CH2-CH2-CH2-), and
- Y represents a linear or branched, aliphatic or cycloaliphatic radical having 4 to 18 carbon atoms or an optionally substituted aromatic or araliphatic radical having 6 to 18 carbon atoms, preferably a linear or branched, aliphatic or cycloaliphatic radical having 6 to 13 carbon atoms, and wherein the compounds of general formula (III) preferably account for a proportion of 2% to 15% by weight, particularly preferably 2% to 10% by weight, of the total mass of the compounds of general formulae (II) and (III).

Particularly preferred examples of such isocyanatosilanes having a thiourethane structure are the reaction products of 2-mercaptoethyltrimethylsilane, 2-mercaptoethylmethyldimethoxysilane, 2-mercaptoethyltrimethoxysilane, 2-mercaptoethyltriethoxysilane, 3-mercaptopropylmethyldimethoxysilane, 3-mercaptopropyldimethylmethoxysilane, 3-mercaptopropyltrimethoxysilane, 3-mercaptopropylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane with 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

Suitable isocyanatoalkoxysilanes C) likewise include for example those having a formylurea structure such as are obtainable by the process of WO 2015/113923 by reaction of formamide-containing silanes with molar excesses of any desired aliphatic, cycloaliphatic, araliphatic or aromatic diisocyanates and subsequent distillative removal of unconverted monomeric diisocyanates.

In a further preferred embodiment the employed isocyanatoalkoxysilane C) is at least one compound of general formula (IV)

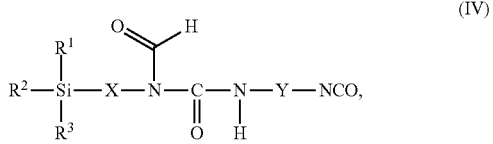

(IV)

which is present in admixture with subordinate amounts of silane-functional compounds of general formula (V),

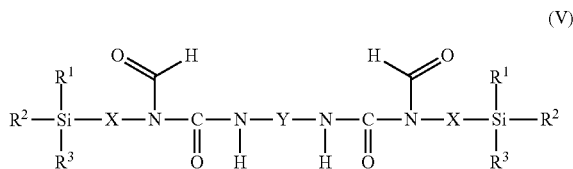

(V)

wherein in formulae (IV) and (V)

$R^1$, $R^2$ and $R^3$ independently of one another represent identical or different saturated or unsaturated linear or branched, aliphatic or cycloaliphatic or optionally substituted aromatic or araliphatic radicals having up to 18 carbon atoms which may optionally contain up to 3 heteroatoms from the group of oxygen, sulfur, nitrogen, preferably in each case alkyl radicals having up to 6 carbon atoms and/or alkoxy radicals having up to 6 carbon atoms which may contain up to 3 oxygen atoms, particularly preferably in each case methyl, methoxy and/or ethoxy with the proviso that at least one of the radicals $R^1$, $R^2$ and $R^3$ is connected to the silicon atom via an oxygen atom, X represents a linear or branched organic radical having up to 6, preferably 1 to 4, carbon atoms, particularly preferably a propylene radical (—CH2-CH2-CH2-), and Y represents a linear or branched, aliphatic or cycloaliphatic radical having 4 to 18 carbon atoms or an optionally substituted aromatic or araliphatic radical having 6 to 18 carbon atoms, preferably a linear or branched, aliphatic or cycloaliphatic radical having 6 to 13 carbon atoms, and wherein the compounds of general formula (V) preferably account for a proportion of 2% to 15% by weight, particularly preferably 2% to 10% by weight, of the total mass of the compounds of general formulae (IV) and (V).

Examples of such isocyanatosilanes having a formylurea structure include the reaction products of formamide silanes such as are obtainable for example by the process disclosed in WO 2015/113923 by reaction of primary amino-bearing amino silanes, in particular 3-aminopropyltrimethoxysilane and/or 3-aminopropyltriethoxysilane, with alkyl formates, preferably with methyl formate and/or ethyl formate, with elimination of alcohol, with aliphatic and/or cycloaliphatic diisocyanates, preferably 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

Further suitable isocyanatoalkoxysilanes C) also include the 1:1 monoadducts of diisocyanates and special secondary aminoalkylalkoxysilanes prepared for example according to the process of EP-A 1 136 495, the aspartic esters obtainable by reaction of dialkyl maleates with aminosilanes and disclosed in EP-A 0 596 360, where the reaction partners are reacted with one another using a large molar isocyanate excess and subsequently the unconverted monomeric diisocyanates are removed by distillation.

Preferred alkoxysilane-functional isocyanates C) for the process according to the invention are isocyanatomethyltrimethoxysilane, isocyanatomethyltriethoxysilane, 3-isocyanatopropyltrimethoxysilane and 3-isocyanatopropyltriethoxysilane, the isocyanatosilanes having a thiourethane structure obtainable by the process of WO 2014/037279 by reaction of 3-mercaptopropyltrimethoxysilane and/or 3-mercaptopropyltriethoxysilane with 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane and any desired mixtures of such isocyanatosilanes.

The use of the recited isocyanatosilanes having a thiourethane structure is particularly preferred.

To perform the process according to the invention the at least one polymeric polyol A) is in a first process step reacted with at least one compound B) that is reactive toward the carboxyl groups of the polyol A). This reaction is preferably carried out at temperatures of 20° C. to 200° C., preferably of 30° C. to 120° C. and particularly preferably of 40° C. to 100° C. in each case optionally in the presence of at least one of the abovementioned aprotic solvents and in each case preferably while maintaining the abovementioned equivalent ratio of carboxyl groups to carboxyl-reactive groups. The reaction proceeds at different rates depending on the nature of the chosen reaction partners A) and B) and the chosen reaction temperature and has generally terminated after a time of 5 min to 48 h, preferably after 10 min to 12 h, particularly preferably after 15 min to 4 h.

The present reaction product of polymeric polyol A) and the carboxyl-reactive compound B) is in a further step reacted with at least one alkoxysilane-functional isocyanate C). This reaction to afford silane-containing polyurethanes is preferably carried out at temperatures of 20° C. to 200° C., preferably of 40° C. to 160° C. and particularly preferably of 60° C. to 120° C. in each case optionally in the presence of at least one of the abovementioned aprotic solvents. Here and generally as a further preferred embodiment the reaction of the hydroxyl groups of the reaction product with the alkoxysilane-functional isocyanate C) is carried out while maintaining an equivalent ratio of isocyanate groups to hydroxyl groups of 0.7:1 to 1.5:1, preferably of 0.8:1 to 1.2:1, particularly preferably of 0.9:1 to 1.1:1, and very particularly preferably of 1:1 to 1.05:1.

The process of the invention may be performed in uncatalysed fashion. However, in particular to accelerate the urethanization reaction, co-use of catalysts customary in isocyanate chemistry is optionally also possible. Examples include tertiary amines, for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,2-dimethylimidazole, 2-methylimidazole, N,N-dimethylimidazole-β-phenylethylamine, 1,4-diazabicyclo[2.2.2]octane (DABCO) and bis(N,N-dimethylaminoethyl) adipate, amidines, for example 1,5-diazabicyclo[4.3.0]nonene (DBN), 1,8-diazabicyclo[5.4.0]undec-7-ene (DBU) and 2,3-dimethyl-3,4,5,6-tetrahydropyrimidine, alkanolamine compounds, for example triethanolamine, triisopropanolamine, N-methyldiethanolamine, N-ethyldiethanolamine, dimethylaminoethanol and 2-(N,N-dimethylaminoethoxy)ethanol, N,N',N''-tris(dialkylaminoalkyl) hexahydrotriaz,ines, for example N,N',N''-tris (dimethylaminopropyl)-s-hexahydrotriazine, bis (dimethylaminoethyl) ether and metal salts, for example inorganic and/or organic compounds of iron, lead, bismuth, zinc and/or tin in customary oxidation states of the metal, for example iron(II) chloride, iron(III) chloride, bismuth(III) bismuth(III) 2-ethylhexanoate, bismuth(III) octoate, bismuth(III) neodecanoate, ytterbium(III) heptadionate, ytterbium(III) acetylacetonate and ytterbium(III) chloride, zinc chloride, zinc 2-ethylcaproate, tin(II) octoate, tin(II) ethylcaproate, tin(II) palmitate, dibutyltin(IV) dilaurate (DBTL), dibutyltin(IV) dichloride or lead octoate.

Preferably employed catalysts are bismuth and tin compounds of the recited type. Particularly preferred catalysts are bismuth(III) 2-ethylhexanoate and dibutyltin(IV) dilaurate (DBTL).

In the process according to the invention these catalysts may be used individually or in the form of any desired mixtures with one another and are used, if at all, in amounts of 0.001% to 1.0% by weight, preferably 0.01% to 0.5% by weight, calculated as the total weight of catalysts used based on the total weight of the reaction partners A), B) and C).

In order to prevent premature crosslinking of the silane groups during the process according to the invention, it may be advantageous to add water scavengers, for example orthoformic esters, for example triethyl orthoformate, or vinylsilanes, for example vinyltrimethoxysilane. These water scavengers are used, if at all, in amounts of up to 5% by weight, preferably up to 2% by weight, calculated as the total weight of the employed water scavengers based on the total weight of the reaction partners A), B) and C).

In a preferred embodiment of the process according to the invention, the alkoxysilane-functional isocyanate C) is optionally initially charged under inert gas, for example nitrogen, and optionally in the presence of a suitable solvent of the type specified, at a temperature between 20 and 100° C. Subsequently, the reaction product of a polymeric polyol A) or a mixture of polymeric polyols A) with one or more carboxyl-reactive compounds B) is added optionally together with further solvent in any desired sequence successively or in admixture in the abovementioned equivalent ratio of isocyanate groups to hydroxyl groups and the reaction temperature for the urethanization is set to a temperature of 40° C. to 160° C. optionally using suitable (heating or cooling) measures. In case of co-use of catalysts and/or water scavengers, these may be added to the alkoxysilane-functional isocyanate C) and/or to the reaction product of A and B) even before commencement of the actual urethanization reaction. However, it is also possible to add these auxiliaries to the reaction mixture at any time during or after termination of the urethanization reaction. To remove residual moisture in the polyol component A) any water scavengers to be co-used are added thereto preferably before commencement of the actual reaction.

In the process according to the invention the progress of the urethanization reaction may be tracked for example by titrimetrically determining the NCO content according to DIN EN ISO 11909:2007-05 or by IR spectroscopy, Obtained as the products of the process according to the invention after the urethanization reaction, preferably after complete conversion of isocyanate and hydroxyl groups, are the silane-containing polyurethanes according to the invention.

The invention further provides silane-containing polyurethanes, prepared or preparable by process according to the invention.

The silane-containing polyurethanes according to the invention are valuable binders for preparing raw materials for lacquers, sealants or adhesives crosslinkable via silane structures.

The invention further provides for the use of the silane containing polyurethanes according to the invention in the production of crosslinkable binders, in particular for raw materials for lacquers, sealants or adhesives, and also the crosslinkable binders containing the silane-containing polyurethanes according to the invention.

The silane-containing polyurethanes according to the invention may be employed as binders for preparing raw materials for lacquers, sealants or adhesives either in solvent-free form but, where required, may also be diluted with customary solvents, for example the abovementioned inert lacquer solvents for optional co-use in the process according to the invention, without causing turbidity.

The curing of the silane-containing polyurethanes according to the invention may be effected by moisture crosslinking in the manner of a sol-gel reaction or else thermally, for example also in the absence of moisture.

Co-use of catalysts which accelerate the hydrolysis and condensation of alkoxysilane groups or the thermally induced condensation is also possible here, In addition to the abovementioned urethanization catalysts such catalysts include for example acids such as for example organic carboxylic acids, for example acetic acid and trifluoroacetic acid, sulfuric acid, p-toluenesulfonic acid, trifluoromethanesulfonic acid, dodecylbenzenesulfonic acid, phophoric acid, phosphoric monoesters and phosphoric diesters, for example dibutyl phosphate, 2-ethylhexyl phosphate, phenyl phosphate and bis(2-ethylhexyl) phosphate, and also phosphonic acid, phosphonic diesters and diphosphonic diesters such as are described in WO 2007/033786 for example.

Catalysts suitable for silane crosslinking likewise include bases, for example the N-substituted amidines 1,5-diazabicyclo[4.3.0]non-5-ene (DBN) and 1,5-diazabicyclo[5.4.0] undec-7-ene (DBU), or else metal salts and metal chelates, for example tetraisopropyl titanate, tetrabutyl titanate, titanium(IV) acetylacetonate, aluminum tri-sec-butoxide, aluminum acetylacetonate, aluminum triflate, tin triflate or zirconium ethylacetoacetate such as are described in WO 2006/042658 for example.

Suitable catalysts for silane crosslinking further include phosphoric esters and phosphonic esters of the abovementioned type that are present in amine-blocked, preferably tertiary amine-blocked, form. Particularly preferred catalysts of this type are those that liberate the acidic phosphoric and phosphonic esters constituting the actual active catalysts in the temperature range from 80° C. to 150° C. by elimination of the blocking amine. Suitable amine-blocked phosphoric acid catalysts are described in WO 2008/074489 and WO 2009,077180 for example.

Suitable catalysts for silane crosslinking likewise include organic sulfonic acids of the abovementioned type which are employed in blocked form, for example in amine-neutralized form, or as adducts onto epoxides such as described in DE 2 356 768 131 and liberate the catalytic sulfonic acids above, for example, 80° C.

Further catalysts suitable for crosslinking of silane groups also include tetraalkylammonium carboxylates, such as, for example, tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and/or tetrabutylammonium benzoate.

Catalysts suitable for crosslinking of silane groups also include quaternary ammonium and phosphonium polyfluorides such as are known as trimerization catalysts for isocyanate groups from EP-A 0 798 299, EP-A 0 896 009 and EP-A 0 962 455 for example.

Suitable catalysts for the silane crosslinking lastly also include zinc-amidine complexes, which are preparable by the process of WO 2014/016019 by reaction of one or more zinc(II) biscarboxylates with amidines.

Preferred catalysts for crosslinking the silane groups are acidic phosphoric esters, phosphonic esters and sulfonic acids of the recited type, optionally in amine-blocked form, amidine bases and also tetraalkylammonium carboxylates of the recited type.

These catalysts are used, if at all, in amounts of up to 5% by weight, preferably up to 2% by weight, calculated as the total weight of employed catalysts based on the weight of the silane-containing polyurethanes used as binder. Depending on the type and amount of the employed catalyst the curing of the coating compositions, sealants or adhesives formulated from the process products according to the invention may be carried out over a wide temperature range, for example from −20° C. to 200° C., preferably from 0° C. to 180° C., particularly preferably from 20° C. to 160° C.

The coating systems, sealants or adhesives formulated with the silane-containing polyurethanes according to the invention may also be supplemented with any desired further hydrolyzable silane compounds, for example tetramethoxysilane, tetraethoxysilane, methyltrimethoxysilane, methyltriethoxysilane, ethyltriethoxysilane, isobutyltrimethoxysilane, isobutyltriethoxysilane, octyltriethoxysilane, octyltrimethoxysilane, 3-aminopropyltrimethoxysilane, 3-aminopropyltriethoxysilane, (3-glycidyloxypropyl)methyldiethoxysilane, (3-glycidyloxypropyl)trimethoxysilane, phenyltrimethoxysilane, phenyltriethoxysilan or silane-functional copolymers of the type specified in U.S. Pat. No. 4,499,150, or mixtures of such silane compounds as reaction partners.

For the formulation of lacquers, sealants or adhesives the silane-containing polyurethanes according to the invention can also be supplemented with any desired further customary assistant and additive substances, for example UV stabilizers, antioxidants, water scavengers, slip additives, defoamers, leveling agents, rheology additives, flame retardants, fillers and/or pigments.

In addition to use as sole binders, the process products according to the invention may also be added, for example as an additive, to customary 1-component or 2-component polyurethane systems, for example in order to achieve very specific properties, for example for improving adhesion.

The application of the coatings, sealants or adhesives formulated using the silane-containing polyurethanes according to the invention may be effected by methods known per se, for example by spraying, brushing, dipping, flow-coating, or with the aid of rollers or knife coaters, in one or more layers. Possible substrates include any desired substrates, for example metal, wood, glass, stone, ceramic materials, concrete, hard and flexible plastics, textiles, leather and paper, which may optionally also be provided with customary primers prior to coating.

The present invention accordingly also provides the abovementioned substrates coated with silane-containing polyurethanes according to the invention.

The present invention is hereinbelow more particularly elucidated with the aid of examples and comparative examples without, however, restricting it thereto.

EXAMPLES

All percentages are based on weight unless otherwise stated.

The NCO contents were determined by titrimetry according to DIN EN ISO 11909:2007-05.

OH numbers were determined by titrimetry according to DIN 53240-2: 2007-11, acid numbers according to DIN EN ISO 2114:2002-06. The OH contents reported were calculated from the OH numbers determined by analysis. The reported values in each case relate to the total weight of the respective composition including any solvent also used.

All viscosity measurements were taken with a Physica MCR 51 rheometer from Anton Paar Germany GmbH (DE) according to DIN EN ISO 3219:1994-10 at a shear rate of 250 s$^{-1}$.

The residual monomer contents were measured according to DIN EN ISO 10283:2007-11 by gas chromatography with an internal standard.

The proportions of bis adduct (composed of two molecules of mercaptosilane and one molecule of diisocyanate) in the alkoxysilane-functional isocyanates C) were determined by gel permeation chromatography based on DIN 55672-1:2016-03 (gel permeation chromatography (GPC)—part 1: tetrahydrofuran (THF) as eluent) with the modification that a flow rate of 0.6 ml/min rather than 1.0 ml/min was used. The proportions of bis adduct in area % taken from the chromatograms, which were determined with software assistance, were each equated approximately to proportions in % by weight and reported as such based on the total amount of mono adduct and his adduct.

Starting Compounds

Polymeric Polyols A)

Polymeric Polyol A1)

70% solution in butyl acetate of polyacrylate polyol prepared from 34.0% hydroxyethyl methacrylate, 25.1% n-butyl acrylate, 40.0% styrene and 0.9% acrylic acid.
OH number (OH content) 98 mg KOH/g (3.0%)
Equivalent weight: 572 g/eq OH
Acid number: 7.5 mg KOH/g
Viscosity (23° C.): 3,500 mPas

Polymeric Polyol A2)

60% solution in Solvent naphtha 100 of polyacrylate polyol prepared from 23.2% hydroxypropyl methacrylate, 29.6% n-butyl acrylate, 44.7% styrene, 1.9% methyl methacrylate and 0.6% acrylic acid.
OH number (OH content) 53 mg KOH/g (1.6%)
Equivalent weight: 1062 g/eq OH
Acid number: 4.0 mg KOH/g
Viscosity (23° C.): 2,800 mPas

Polymeric Polyol A3)

65% solution in butyl acetate/xylene (3:1) of a mixture of 63 parts by weight of a polyacrylate polyol prepared from 32.5% hydroxyethyl methacrylate, 24.5% n-butyl acrylate, 41.9% styrene and 1.1% acrylic acid and 37 parts by weight of a polyester polyol prepared from 10.0% adipic acid, 20.2% 2-ethylhexanoic acid, 41.2% trimethylolpropane, 27.0% phthalic anhydride and 1.6% maleic anhydride.
OH number (OH content) 96 mg KOH/g (2.9%)
Equivalent weight: 585 g/eq OH
Acid number: 9.0 mg KOH/g
Viscosity (23° C.): 3,000 mPas

Polymeric Polyol A4)

Solvent-free polyester polyol prepared from 11.9% adipic acid, 33.7% isophthalic acid, 10.7% trimethylolpropane, 37.7% hexane-1,6-diol and 6.0% phthalic anhydride.
OH number (OH content) 143 mg KOH/g (4.3%)
Equivalent weight: 392 g/eq OH
Acid number: 1 mg KOH/g
Viscosity (23° C.): 3,500 mPas

Carboxyl-Reactive Compounds B)

Carboxyl-Reactive Compounds B1)

Di(2,6-diisopropylphenyl)carbodiimide (Stabaxol® I, Rheinchemie Rheinau GmbH, Germany)
Carbodiimide content: 20.4% (calculated as —N=C=N—, molecular weight=40)

Carboxyl-Reactive Compounds B2)

2-Ethylhexyl glycidyl ether (Sigma-Aldrich Chemie GmbH, Germany)
Epoxide content: 23.1% (calculated as $C_2H_3O$, molecular weight=43)

Alkoxysilane-Functional Isocyanates C)

Alkoxysilane-Functional Isocyanate C1)

1680 g (10 mol) of hexamethylene diisocyanate (HDI) were admixed at a temperature of 80° C. under dry nitrogen with 196 g (1.0 mol) of mercaptopropyltrimethoxysilane and, after addition of 0.05 g (25 ppm) of 1,4-diazabicyclo[2.2.2]octane (DABCO), the mixture was stirred for 1 hour until an NCO content of 42.5%, corresponding to a full conversion, had been attained. Subsequently, the unconverted monomeric HDI was removed on a thin-film evaporator at a temperature of 140° C. and a pressure of 0.1 mbar. This gave a virtually colorless, clear isocyanatosilane having the following characteristics:
NCO content: 11.2%
Monomeric HDI: 0.19%
Viscosity (23° C.): 80 mPas
Proportion of bis adduct: 4.1%
Si content (calc.): 8.1%

Alkoxysilane-Functional Isocyanate C2)

1680 g (10 mol) of hexamethylene diisocyanate (HDI) were admixed at a temperature of 80° C. under dry nitrogen with 238 g (1.0 mol) of mercaptopropyltriethoxysilane and, after addition of 0.05 g (25 ppm) of 1,4-diazabicyclo[2.2.2]octane (DABCO), the mixture was stirred for 1 hour until an NCO content of 41.6%, corresponding to a full conversion, had been attained. Subsequently, the unconverted monomeric HDI was removed on a thin-film evaporator at a temperature of 140° C. and a pressure of 0.1 mbar. This gave a virtually colorless, clear isocyanatosilane having the following characteristics:
NCO content: 9.8%
Monomeric HDI: 0.15%
Viscosity (23° C.): 92 mPas
Proportion of bis adduct: 7.8%
Si content (calc.): 7.6%

Alkoxysilane-Functional Isocyanate C3)

2220 g (10 mol) of isophorone diisocyanate (IPDI) were admixed under dry nitrogen at a temperature of 80° C. with 196 g (1.0 mol) of mercaptopropyltrimethoxysilane and, after addition of 0.06 g (25 ppm) of dibutyltin(IV) dilaurate (DBTL), the mixture was stirred for 3 hours until an NCO content of 33.0%, corresponding to a full conversion, had been attained. Subsequently, the unconverted monomeric IPDI was removed on a thin-film evaporator at a temperature of 150° C. and a pressure of 0.1 mbar. This gave a virtually colorless, clear isocyanatosilane having the following characteristics:
NCO content: 9.7%
Monomeric IPDI: 0.23%
Viscosity (23° C.): 5,400 mPas
Proportion of bis adduct: 4.8%
Si content (calc.): 6.9%

Alkoxysilane-Functional Isocyanate C4)

3-isocyanatopropyltrimethoxysilane (Geniosil® GF 40, Wacker Chemie AG, Deutschland)
NCO content: 20.1% (theo: 20.4%)
Si content (calc.): 13.6%

Example 1 (Noninventive)

375.0 g (1.0 val) of the alkoxysilane-functional isocyanate C1) together with 345 g of butyl acetate, 9.5 g of triethyl orthoformate as a water scavenger and 0.06 g of dibutyltin (IV) dilaurate (DBTL) as catalyst were initially charged under dry nitrogen at 80° C., admixed with 572 g (1.0 val) of the polymeric polyol A1) over 30 minutes and, once addition was complete, subjected to continued stirring at this temperature. After a reaction time of about 2 hours a marked viscosity increase of the reaction batch was observable. After 2.5 hours the reaction mixture had undergone complete gelation and was no longer stirrable.

Example 2 (Inventive)

572 g (1.0 val) of the polymeric polyol A1) were diluted with 200 g of butyl acetate and after addition of 15 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 375.0 g (1.0 val) of the alkoxysilane-functional isocyanate C1), 9.5 g of triethyl orthoformate and 0.06 g of DBTL in 145 g of butyl acetate, corresponding to an equivalent ratio of isocyanate groups to hydroxyl groups of 1:1. Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.
Solids content: 60%
Viscosity (23° C.): 1450 mPas
Si content (calc.): 3.8% (based on solids)

Example 3 (Noninventive)

375.0 g (1.0 val) of the alkoxysilane-functional isocyanate C1) together with 250 g of butyl acetate, 10 g of triethyl orthoformate as a water scavenger and 0.08 g of DBTL as catalyst were initially charged under dry nitrogen at 80° C., admixed with 1062 g (1.0 val) of the polymeric polyol A2) over 30 min and, once addition was complete, subjected to continued stirring at this temperature. After a reaction time of 1.5 hours a marked viscosity increase of the reaction batch was observable. After 2 hours the reaction mixture had undergone complete gelation and was no longer stirrable.

Example 4 (Inventive)

1062 g (1.0 val) of the polymeric polyol A2) were diluted with 200 g of butyl acetate and after addition of 14.8 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 375.0 g (1.0 val) of the alkoxysilane-functional isocyanate C1), 10 g of triethyl orthoformate and 0.06 g of DBTL in 60 g of butyl acetate, corresponding to an equivalent ratio of isocyanate groups to hydroxyl groups of 1:1. Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.
Solids content: 60%
Viscosity (23° C.): 3250 mPas
Si content (calc.): 2.9% (based on solids)

Example 5 (Noninventive)

209.0 g (1.0 val) of 3-isocyanatopropyltrimethoxysilane (alkoxysilane-functional isocyanate C4)) together with 238 g of butyl acetate, 6.0 g of triethyl orthoformate as a water scavenger and 0.05 g of dibutyltin(IV) dilaurate (DBTL) as catalyst were initially charged under dry nitrogen at 80° C., admixed with 572 g (1.0 val) of the polymeric polyol A1) over 30 minutes and, once addition was complete, subjected to continued stirring at this temperature. After a reaction time of about 1 hour a marked viscosity increase of the reaction batch was observable. After 2 hours the reaction mixture had undergone complete gelation and was no longer stirrable.

Example 6 (Inventive)

572 g (1.0 val) of the polymeric polyol A1) were diluted with 200 g of butyl acetate and after addition of 15 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 209.0 g (1.0 val) of 3-isocyanatopropyltrimethoxysilane (alkoxysilane-functional isocyanate C4)), 6.0 g of triethyl orthoformate and 0.05 g of DBTL in 48 g of butyl acetate, corresponding to an equivalent ratio of isocyanate groups to hydroxyl groups of 1:1. Once addition was complete the mixture was subjected to further stirring at 80° C. until after about 6 hours isocyanate was no longer detectable by IR spectroscopy. After cooling to room temperature an inventive silane-containing polyurethane was present in the form of a colorless solution.
Solids content: 60%
Viscosity (23° C.): 1320 mPas
Si content (calc.): 4.5% (based on solids)

Comparison of the noninventive examples 1, 3 and 5 with the inventive examples 2, 4 and 6 shows that after reaction of the carboxyl groups present in the polymer with a carboxyl-reactive compound polymeric polyacrylate polyols may very readily be used to prepare fully silane-functionalized polyurethanes (examples 2, 4 and 6) while attempts to react the same polyacrylate polyols with silane-functionalized isocyanates without this pre-reaction (examples 1, 3 and 5) result in gelling of the reaction batch.

Example 7 (Inventive)

585 g (1.0 val) of the polymeric polyol A3) were diluted with 200 g of butyl acetate and after addition of 18.4 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 375.0 g (1.0 val) of the alkoxysilane-functional isocyanate C1), 8 g of triethyl orthoformate and 0.06 g of DBTL in 115 g of butyl acetate, corresponding to an equivalent ratio of isocyanate groups to hydroxyl groups of 1:1. Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.
Solids content: 60%
Viscosity (23° C.): 2900 mPas
Si content (calc.): 3.9% (based on solids)

Example 8 (Inventive)

392 g (1.0 val) of the polymeric polyol A4) were diluted with 350 g of butyl acetate and after addition of 1.4 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 375.0 g (1.0 val) of the alkoxysilane-functional isocyanate C1), 8 g of triethyl orthoformate and 0.06 g of DBTL in 162 g of 1-methoxy-2-propyl acetate, corresponding to an equivalent ratio of isocyanate groups to hydroxyl groups of 1:1. Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.

Solids content: 60%
Viscosity (23° C.): 2450 mPas
Si content (calc.): 3.9% (based on solids)

Example 9 (Inventive)

572 g (1.0 val) of the polymeric polyol A1) were diluted with 200 g of butyl acetate and after addition of 15 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 428.5 g (1.0 val) of the alkoxysilane-functional isocyanate C2), 10.0 g of triethyl orthoformate and 0.06 g of DBTL in 190 g of butyl acetate, corresponding to an equivalent ratio of isocyanate groups to hydroxyl groups of 1:1. Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.
Solids content: 60%
Viscosity (23° C.): 1450 mPas
Si content (calc.): 3.9% (based on solids)

Example 10 (Inventive)

572 g (1.0 val) of the polymeric polyol A1) were diluted with 200 g of butyl acetate and after addition of 15 g of Stabaxol® I, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 262.5 g (0.7 val) of the alkoxysilane-functional isocyanate C1), 129.9 g (0.3 val) of the alkoxysilane-functional isocyanate C3), 12.0 g of triethyl orthoformate and 0.06 g of DBTL in 175 g of butyl acetate, corresponding to an equivalent ratio of isocyanate groups to hydroxyl groups of 1:1. Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.
Solids content: 60%
Viscosity (23° C.): 1840 mPas
Si content (calc.): 3.7% (based on solids)

Example 11 (Inventive)

572 g (1.0 val) of the polymeric polyol A1) were diluted with 200 g of butyl acetate and after addition of 13.5 g (0.077 val) of 2-ethylhexyl glycidyl ether, corresponding to an equivalent ratio of carboxyl groups to carboxyl-reactive groups of 1:1, stirred under dry nitrogen for 3 hours at 50° C.

The thus obtained mixture was subsequently added dropwise over 30 minutes to a solution, initially charged under dry nitrogen at 80° C., of 403.9 g (1.077 val) of the alkoxysilane-functional isocyanate C1), 9.5 g of triethyl orthoformate and 0.06 g of DBTL in 165 g of butyl acetate, corresponding to an equivalent ratio of isocyanate groups to hydroxyl groups of 0:1 (accounting for the additional hydroxyl groups formed during the carboxyl/epoxide reaction). Once addition was complete the mixture was subjected to further stirring at 80° C. until after about 8 hours isocyanate was no longer detectable by IR spectroscopy. After cooling to room temperature an inventive silane-containing polyurethane was present in the form of a colorless solution.
Solids content: 60%
Viscosity (23° C.): 1370 mPas
Si content (calc.): 4.0% (based on solids)

The invention claimed is:

1. A process for preparing silane-containing polyurethanes comprising the reaction of
   A) at least one polymeric polyol having an acid number determined according to DIN EN ISO 2114:2002-06 of 0.01 to 30.0 mg KOH/g based on the solids content with
   B) at least one compound which has at least one carboxyl-reactive group and contains at least one epoxy group, carbodiimide group and/or 2-oxazoline group to obtain a reaction product and the reaction of the reaction product with
   C) at least one alkoxysilane-functional isocyanate.

2. The process as claimed in claim 1, wherein the polymeric polyol A) is an at least difunctional polymeric polyol having a number-average molecular weight $M_n$ of 270 to 22000 g/mol.

3. The process as claimed in claim 1, wherein the polymeric polyol A) is a polyester polyol, polycarbonate polyol and/or polyacrylate polyol.

4. The process as claimed in claim 1, wherein the compound B) having at least one carboxyl-reactive group is at least one mono- or polycarbodiimide based on 2,6-diisopropylphenyl isocyanate and/or 1,3,5-triisopropylbenzene-2,4-diisocyanate.

5. The process as claimed in claim 1, wherein the reaction of the polymeric polyol A) with the at least one compound B) having carboxyl-reactive groups is carried out while maintaining an equivalent ratio of carboxyl groups to carboxyl-reactive groups of 1.5:1 to 1:5.

6. The process as claimed in claim 1, wherein the employed alkoxysilane-functional isocyanate C) is at least one compound which comprises precisely one isocyanate group and precisely one silane group having at least one alkoxy substituent.

7. The process as claimed in claim 1, wherein the employed alkoxysilane-functional isocyanate C) is at least one compound of general formula (I)

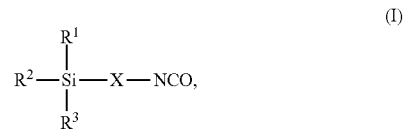

in which
R$^1$, R$^2$ and R$^3$ independently of one another represent identical or different saturated or unsaturated linear or branched, aliphatic or cycloaliphatic or optionally substituted aromatic or araliphatic radicals having up to 18 carbon atoms which may optionally contain up to 3 heteroatoms from the group of oxygen, sulfur, nitrogen with the proviso that at least one of the radicals R$^1$, R$^2$ or R$^3$ is connected to the silicon atom via an oxygen atom and X represents a linear or branched organic radical having up to 6 carbon atoms.

8. The process as claimed in claim 7, wherein in the formula (I)

R$^1$, R$^2$ and R$^3$ independently of one another represent identical or different alkyl radicals having up to 6 carbon atoms and/or alkoxy radicals having up to 6 carbon atoms which may contain up to 3 oxygen atoms with the proviso that at least one of the radicals R$^1$, R$^2$ or R$^3$ is an alkoxy radical and X represents a linear or branched organic radical having 1 to 4 carbon atoms.

9. The process as claimed in claim 1, wherein the employed alkoxysilane-functional isocyanate C) is at least one compound of general formula (II)

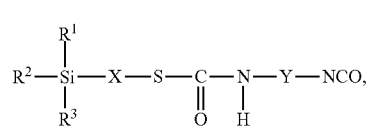

(II)

which is present in admixture with subordinate amounts of silane-functional compounds of general formula (III),

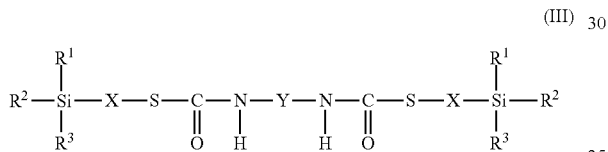

(III)

and wherein

R$^1$, R$^2$ and R$^3$ independently of one another represent identical or different saturated or unsaturated linear or branched, aliphatic or cycloaliphatic or optionally substituted aromatic or araliphatic radicals having up to 18 carbon atoms which may optionally contain up to 3 heteroatoms from the group of oxygen, sulfur, nitrogen, with the proviso that at least one of the radicals R$^1$, R$^2$ and R$^3$ is connected to the silicon atom via an oxygen atom, X represents a linear or branched organic radical having up to 6 carbon atoms, and Y represents a linear or branched, aliphatic or cycloaliphatic radical having 4 to 18 carbon atoms or an optionally substituted aromatic or araliphatic radical having 6 to 18 carbon atoms and wherein the compounds of general formula (III) account for a proportion of 2% to 15% by weight of the total mass of the compounds of general formulae (II) and (III).

10. The process as claimed in claim 9, wherein the alkoxysilane-functional isocyanate C) is at least one reaction product of 3-mercaptopropyltrimethoxysilane and/or 3-mercaptopropyltriethoxysilane with 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or a mixture thereof.

11. The process as claimed in claim 1, wherein the employed alkoxysilane-functional isocyanate C) is at least one compound of general formula (IV)

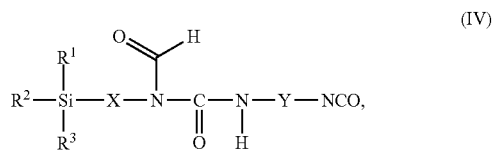

(IV)

which is present in admixture with subordinate amounts of silane-functional compounds of general formula (V),

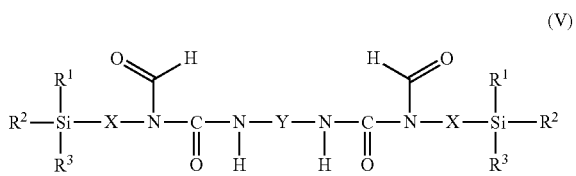

(V)

and wherein

R$^1$, R$^2$ and R$^3$ independently of one another represent identical or different saturated or unsaturated linear or branched, aliphatic or cycloaliphatic or optionally substituted aromatic or araliphatic radicals having up to 18 carbon atoms which may optionally contain up to 3 heteroatoms from the group of oxygen, sulfur, nitrogen, with the proviso that at least one of the radicals R$^1$, R$^2$ and R$^3$ is connected to the silicon atom via an oxygen atom, X represents a linear or branched organic radical having up to 6 carbon atoms, and Y represents a linear or branched, aliphatic or cycloaliphatic radical having 4 to 18 carbon atoms or an optionally substituted aromatic or araliphatic radical having 6 to 18 carbon atoms;

and wherein the compounds of general formula (V) account for a proportion of 2% to 15% by weight of the total mass of the compounds of general formulae (IV) and (V).

12. The process as claimed in claim 1, wherein the reaction of the reaction product with the alkoxysilane-functional isocyanate C) is carried out while maintaining an equivalent ratio of isocyanate groups to hydroxyl groups of 0.7:1 to 1.5:1.

13. A silane-containing polyurethane prepared by a process of claim 1.

14. A method comprising utilizing the silane-containing polyurethanes as claimed in claim 13 for preparing a crosslinkable binder.

15. A crosslinkable binder containing silane-containing polyurethanes as claimed in claim 13.

* * * * *